United States Patent
Lundin et al.

(10) Patent No.: US 12,412,022 B2
(45) Date of Patent: Sep. 9, 2025

(54) VISUAL TEXT SUMMARY GENERATION

(71) Applicant: salesforce.com, inc., San Francisco, CA (US)

(72) Inventors: Jessica Lundin, Bellevue, WA (US); Sönke Rohde, San Francisco, CA (US); Owen Winne Schoppe, Orinda, CA (US); Michael Sollami, Cambridge, MA (US); David Woodward, Bozeman, MT (US); Brian Lonsdorf, San Francisco, CA (US); Alan Martin Ross, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 17/542,844

(22) Filed: Dec. 6, 2021

(65) Prior Publication Data
US 2023/0177250 A1    Jun. 8, 2023

(51) Int. Cl.
*G06F 40/103* (2020.01)
*G06F 40/247* (2020.01)
*G06N 5/04* (2023.01)
*G06T 11/60* (2006.01)

(52) U.S. Cl.
CPC .......... *G06F 40/103* (2020.01); *G06F 40/247* (2020.01); *G06N 5/04* (2013.01); *G06T 11/60* (2013.01)

(58) Field of Classification Search
CPC .... G06F 40/103; G06F 40/247; G06F 40/216; G06F 40/284; G06F 40/30; G06N 5/04; G06N 3/045; G06T 11/60
See application file for complete search history.

(56) References Cited

U.S. PATENT DOCUMENTS

| | | | |
|---|---|---|---|
| 8,290,975 B2* | 10/2012 | Gao | G06F 16/3322 707/750 |
| 11,126,796 B2* | 9/2021 | Chhabra | G06Q 10/10 |
| 2007/0118542 A1* | 5/2007 | Sweeney | G06F 16/84 |
| 2007/0220052 A1* | 9/2007 | Kudo | G06F 16/68 |
| 2008/0148175 A1* | 6/2008 | Naaman | G06F 16/9537 715/781 |
| 2009/0164456 A1* | 6/2009 | Slaney | G06F 16/5866 707/999.005 |
| 2009/0187403 A1* | 7/2009 | Nomitsu | G06F 21/105 704/235 |
| 2011/0316884 A1* | 12/2011 | Giambalvo | G06T 3/40 345/660 |
| 2012/0221494 A1* | 8/2012 | Pasetto | G06N 5/00 706/12 |

(Continued)

*Primary Examiner* — Chau T Nguyen
(74) *Attorney, Agent, or Firm* — Butzel Long

(57) ABSTRACT

Systems, devices, and techniques are disclosed for visual text summary generation. An input text may be received. Keywords may be extracted from the input text. Representative keywords may be generated from the keywords. A graph representation of the representative keywords may be generated. Images associated with the representative keywords may be received. A visual-representation style may be selected based on the graph representation of the representative keywords. The images associated with the representative keywords may be arranged according to the selected visual-representation style and the graph representation of the representative keywords.

20 Claims, 11 Drawing Sheets

(56) References Cited

U.S. PATENT DOCUMENTS

| | | | |
|---|---|---|---|
| 2013/0191392 A1* | 7/2013 | Kumar | G06F 16/358 |
| | | | 707/748 |
| 2015/0058718 A1* | 2/2015 | Kim | G06F 3/03545 |
| | | | 715/268 |
| 2016/0283494 A1* | 9/2016 | Krishnaswamy | G06F 16/3334 |
| 2017/0242875 A1* | 8/2017 | Jiang | G06F 16/51 |
| 2018/0018349 A1* | 1/2018 | Liu | G06V 30/413 |
| 2019/0279409 A1* | 9/2019 | Kim | G06F 16/338 |
| 2020/0034482 A1* | 1/2020 | Masuda | G06F 16/353 |
| 2021/0035167 A1* | 2/2021 | Hu | G06Q 30/0277 |
| 2021/0081719 A1* | 3/2021 | Banerjee | G06T 11/00 |
| 2022/0179893 A1* | 6/2022 | Kim | G06F 40/279 |
| 2023/0032564 A1* | 2/2023 | Ishii | G06F 16/9035 |

\* cited by examiner

VISUAL TEXT SUMMARY GENERATION

BACKGROUND

Text-based communication, including through messaging applications, and text transcriptions of in-person and virtual meetings can produce large amounts of text that may be difficult or time consuming for individuals to read through entirely to understand or summarize the text. Visual representations of text may allow for faster understanding of the text, but may be difficult to produce.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

Figure 1:
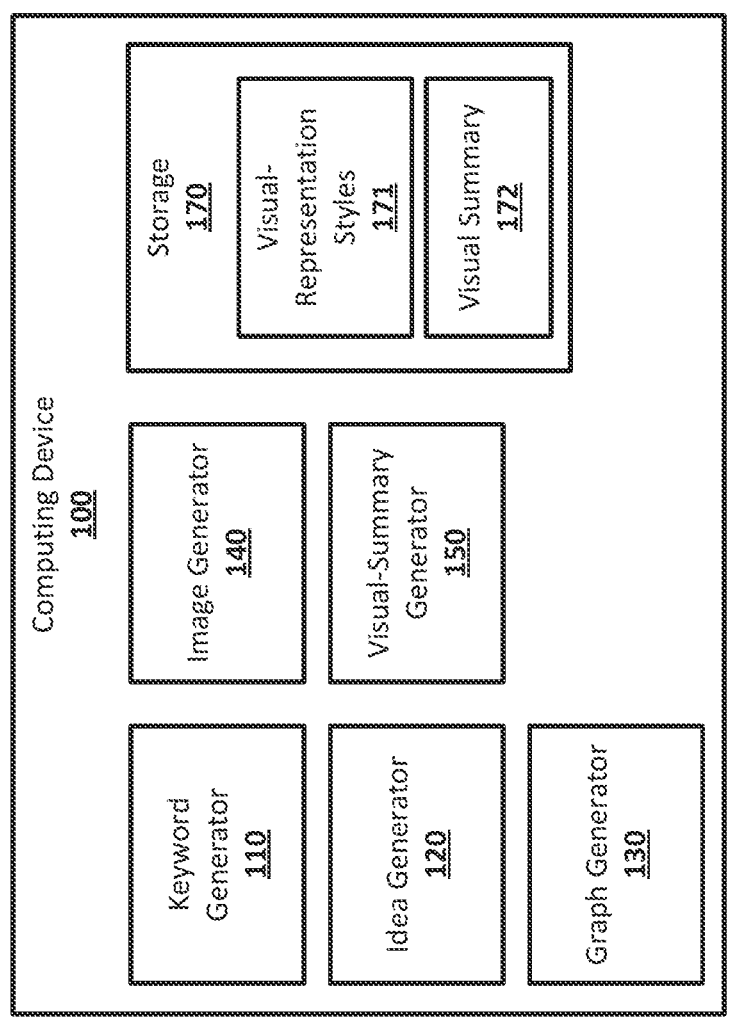
FIG. 1 shows an example system suitable for visual text summary generation according to an implementation of the disclosed subject matter.

Techniques disclosed herein enable visual text summary generation, which may allow for the generation of a visual summary of an input text that includes images arranged based on input the text. An input text may be received. Keywords may be extracted from the input text. Representative keywords may be generated from the keywords. A graph representation of the representative keywords may be generated. Images associated with the representative keywords may be received. A visual-representation style based on the graph representation of the representative keywords may be selected. The images associated with the representative keywords may be arranged according to the selected visual-representation style and the graph representation of the representative keywords.

An input text may be received. The input text may be at text of any suitable conversation and may be received from any suitable source. For example, the input text may be the text of messages from a communications channel of a communications platform used for threaded messaging or a text transcription of a virtual or in-person meeting. The input text may also be, for example, a transcription of a speech or question and answer event. The identity of speakers or senders of messages in an input text my be removed or obscured, or they may otherwise be deidentified. The input text may be in any suitable format for text data.

Keywords may be extracted from the input text. Any suitable form of keyword extraction may be used to extract keywords from the input text. For example, any of term frequency-inverse document frequency (TF-IDF), TopicRank, Yet Another Keyword Extractor (YAKE), KeyBERT and Rapid Automated Keyword Extraction (RAKE) may be used to extract keywords from the input text. When using a form of keyword extraction that requires multiple documents, such as TF-IDF, the input text may be divided into multiple documents, for example, separating the pages or paragraphs into their own documents. If the input text is divided into multiple documents, the extracted keywords may be at the level of the granularity used to divide the input text. For example, dividing the input text by paragraphs into separate documents and using TF-IDF to extract keywords may result in the keywords being extracted on a per-paragraph basis. To extract keywords on the level of the entirety of the input text using TF-IDF, additional documents may be in the form of documents from any suitable collection of text documents, including, for example, prior input texts. The extracted keywords may be individual words, or may be multiword phrases.

Representative keywords may be generated from the keywords. Any suitable form of synonym identification, such as, multi-word synonym inference, may be used to identify synonyms among the keywords. Any single keyword may be synonymous with multiple other keywords. Keywords are that are determined to be synonyms may be a group that represents an idea. One of the keywords from the group of synonymous keywords that represent an idea may be selected as a representative keyword for the idea. The representative keyword for an idea may be selected in any suitable manner, such as, for example, based on which of the keywords is the broadest expression of the idea or which keyword is used most frequently in the input text. The number of keywords in a group representing an idea may be the idea count for the idea. Representative keywords may be generated from keywords at the same level of granularity used in the generation of the keywords. For example, if the keywords were generated on a per-paragraph basis, the representative keywords may also be generated on a per-paragraph basis.

A graph representation of the representative keywords may be generated. The graph representation of the representative keywords may be generated in any suitable manner, using, for example, a summarization model. The graph representation may be generated by using the keywords and the input text from which the keywords were generated as input to a summarization model. The summarization model may determine the relationships between the keywords within the input text. The relationships may be grammatical relationships or may be relationships based on the relative locations within the input text. For example, relationships may be based on keywords that are nouns being subjects, direct objects, or indirect objects of keywords that are verbs, keywords of any type appearing to form lists or a series of steps, or keywords that are all connected to or modify in some way a central keyword. The relationships between keywords may be imparted to the representative keywords for the ideas the keywords form groups representing. For example, the relationship between a first keyword and a second keyword in the input text may be that the first keyword is verb and the second keyword is a noun that is the direct object of the verb of the first keyword. This relationship may be imparted to a first representative keyword for an idea whose group of keywords includes the first keyword and a second representative keyword for an idea whose group of keywords includes the second keyword, so that the first representative keyword is considered a verb of which the second representative keyword is the direct object. The graph representation may include representative keywords as nodes with any relationship between representative keywords represented as an edge of the graph between the nodes for the representative keywords. The graph representation may in some cases be disjoint.

Images associated with the representative keywords may be received. The images may be received in any suitable manner from any suitable repository of images. For example, an image database may be searched using a representative keyword, and the image that is the top-ranked search result may be received from the image database. Different image databases may be used for keywords of different types. For example, representative keywords that are nouns or proper nouns may have images received from a database of clipart-style images, while images for representative keywords that are verbs may be received from a general online image database that may include images in any style. An image database search may also use other keywords from the group that the representative keyword was selected from, for example, to narrow down search results or to ensure that the image received for a representative keyword better represents the idea whose group of the keywords the representative keyword was selected from. Images may be received for all of the representative keywords for an input text. The received images may have a style applied to them. For example, the received images may be used as input to a generative adversarial network (GAN) that may be able to apply to an input image a selected style, rendering the image in that style. Styles applied to the image may include, for example, clipart-styles to non-clipart images, photo styles, any type of sketching style, styles that mimic artistic styles such as impressionism and cubism, or any other suitable styles. All images may have the same style applied to them using a GAN. The style may be selected by, for example, a user who may set an input parameter for the GAN that may indicate the selected style, or may be selected by the GAN, for example, randomly.

A visual-representation style based on the graph representation of the representative keywords may be selected. The graph representation of the representative keywords may be compared structurally to any number of visual-representation styles to determine which visual-representation style has the closest structure to the graph structure. The visual-representation styles may include, for example, linear styles in which visual elements are arranged in a line that flows in one direction, for example, top-to-bottom or left-to-right, and non-linear styles, in which visual elements are arranged in any number of different patterns. The visual-representation styles may also have different levels of connectivity between visual elements, with visual elements being joint or disjoint in any suitable manner.

The images associated with the representative keywords may be arranged according to the selected visual-representation style and the graph representation of the representative keywords. This may generate the visual summary of the input text. The images for the representative keywords may be arranged as the visual elements of the visual-representation style while preserving the structure of the graph representation of the representative keywords. This may allow the relationships between the representative keywords to be maintained while using the visual-representation style to determine the arrangement of the images for the representative keywords within a given space. The visual-representation style may be used to provide absolute positioning to nodes of the graph representation, as the graph representation may not include any positioning data for the nodes within the graph. The visual-representation style may also be used to provide additional visual elements, such as, for example, visual elements that may connect the images associated with the representative keywords to represent edges between nodes of the graph representation. The images for the representative keywords may also have text added to them. For example, an image for a representative keyword may have the representative keyword, or any other keywords from the group the representative keyword was selected from, added to it. The image for a representative keyword may also be visually modified based on the idea count for the idea the representative keyword represents. For example, if a representative keyword represents and idea with a large idea count, the image for the representative keyword may be made larger in the visual summary, as the large idea count may indicate that the idea is prominent in the input text and should be prominent in the visual summary of the input text.

The visual summary of the input text may be used in any suitable manner. For example, the visual summary of the input text may be stored, displayed, or sent to any suitable recipient using any suitable form of electronic communication. The visual summary may be added to the an electronically accessible version of the input text, so that a user accessing the input text may be able to easily access the visual summary of the input text.

A visual summary of an input text may be updated and modified based on changes to the input text. For example, if the input text is a live conversation, such as a conversation thread in a communications channel that may have messages added to it, the input text may be updated with additions as the live conversation continues, for example, more messages are posted in the conversation thread. When the input text is updated, the updates to the input text may be used to either add to the visual summary of the input text without modifying the already generated parts of the visual summary, or to modify the visual summary by adding and removing parts of the visual summary. For example, additions to an input text may be treated as a new input text, which may be used to generate new keywords, new representative keywords, a new graph representation, and a new visual summary which may be added to the already generated visual summary for the input text. The new visual summary may be forced to use the same visual-representation style as the already generated visual summary, or may be allowed to use a new visual-representation style. Overlaps between the graph representation for the input text and the new graph representation made be used to join the graph representations, allowing for the visual summary to be joined with the new visual summary. The additions to the input text may also result in the entire input text, including the additions, to be used to generate new keywords, new representative keywords, a new graph representation, and an updated visual summary which may add images for nodes in the new graph representation that were not in the original graph representation, and may remove images for nodes that were in the original graph representation but are not in the new graph representation. This may allow a visual summary to be updated as a live conversation continues to reflect the entirety of the live conversation at the time the live conversation is used as input text to generate the visual summary.

FIG. 1 shows an example system suitable for visual text summary generation according to an implementation of the disclosed subject matter. A computing device 100 may be any suitable computing device, such as, for example, a computer 20 as described in FIG. 6, or component thereof, for implementing visual text summary generation. The computing device 100 may include a keyword generator 110, an idea generator 120, a graph generator 130, an image generator 140, a visual-summary generator 150, and a storage 170. The computing device 100 may be a single computing device, or may include multiple connected computing devices, and may be, for example, a laptop, a desktop, an individual server, a server cluster, a server farm, or a distributed server system, or may be a virtual computing device or system, or any suitable combination of physical and virtual systems. The computing device 100 may be part of a computing system and network infrastructure, or may be otherwise connected to the computing system and network infrastructure, including a larger server network which may include other server systems similar to the computing device 100. The computing device 100 may include any suitable combination of central processing units (CPUs), graphical processing units (GPUs), and tensor processing units (TPUs).

The keyword generator 110 may be any suitable combination of hardware and software of the computing device 100 for generating keywords from an input text. Keywords may be extracted from the input text. The keyword generator 110 may use any suitable form of keyword extraction to extract keywords from an input text, generating keywords for the input text. For example, the keyword generator 110 may use term frequency-inverse document frequency (TF-IDF) or Rapid Automated Keyword Extraction (RAKE) to extract keywords from an input text. If needed by the form of keyword extraction used, the keyword generator 110 may divide the input text into multiple documents, for example, separating the pages or paragraphs into their own documents. If the input text is divided into multiple documents, the keyword generator 110 may extract keywords at the level of the granularity used to divide the input text. For example, if the keyword generator 110 divides the input text by paragraphs into separate documents and uses TF-IDF to extract keywords, the keyword generator 110 may extract keywords on a per-paragraph basis. To extract keywords on the level of the entirety of the input text using TF-IDF, the keyword generator 110 may use additional documents in the form of documents from any suitable collection of text documents, including, for example, prior input texts. The extracted keywords may be individual words, or may be multiword phrases.

The idea generator 120 may be any suitable combination of hardware and software of the computing device 100 for generating representative keywords and idea counts from keywords. Representative keywords may be generated from the keywords generated by the keyword generator 110. The idea generator 120 may use any suitable form of synonym identification, such as, multi-word synonym inference, to identify synonyms among the keywords. Any single keyword may be synonymous with multiple other keywords. The idea generator 120 may generate groups that represent ideas from keywords are that are determined to be synonyms, and may select one of the keywords from the group of synonymous keywords that represent an idea as a representative keyword for the idea. The representative keyword for an idea may be selected in any suitable manner, such as, for example, based on which of the keywords is the broadest expression of the idea or which keyword is used most frequently in the input text. The idea generator 120 may also generate idea counts for the ideas, which may be the number of keywords in a group representing an idea.

The graph generator 130 may be any suitable combination of hardware and software of the computing device 100 for generating a graph representation from keywords. The graph generator 130 may generate a graph representation from the representative keywords generated by the idea generator 120. The graph generator 130 may, for example, implement a summarization model, which may be a machine learning model of any suitable type. The graph generator 130 may generate a graph representation using the keywords and the input text from which the keywords were generated by determining the relationships between the keywords within the input text. The relationships may be grammatical relationships or may be relationships based on the relative locations within the input text. The relationships between keywords may be imparted to the representative keywords for the ideas the keywords form groups representing. The graph representation generated by the graph generator 130 may include representative keywords as nodes with any relationship between representative keywords represented as an edge of the graph between the nodes for the representative keywords. The graph representation may in some cases be disjoint.

The image generator 140 may be any suitable combination of hardware and software of the computing device 100 for generating images to be used in a visual summary. The image generator 140 may receive images associated with the representative keywords in any suitable manner from any suitable repository of images. For example, the image generator 140 may search an image database may using a representative keyword, and the image that is the top-ranked search result may be received by the image generator 140 from the image database. The image generator 140 may search different image databases for keywords of different types. For example, the image generator 140 may search for and receive images for representative keywords that are nouns or proper nouns from a database of clipart-style images and images for representative keywords that are verbs from a general online image database that may include images in any style. The image generator 140 may also search images databases using other keywords from the group that the representative keyword was selected from, for example, to narrow down search results or to ensure that the image received for a representative keyword better represents the idea whose group of the keywords the representative keyword was selected from. The image generator 140 may receive images for all of the representative keywords for an input text. The input generator 140 may apply a style applied to the received images. For example, the image generator 140 may include a GAN that may be able to apply to an input image a selected style, rendering the image in that style. The received images may be used as input to the GAN of the image generator 140. Styles applied to the image may include, for example, clipart-styles to non-clipart images, photo styles, any suitable sketching style, styles that mimic artistic styles such as impressionism and cubism, or any other suitable style. All images may have the same style applied to them using the GAN.

The visual-summary generator 150 may be any suitable combination of hardware and software of the computing device 100 for generating a visual summary from images for representative keywords and a graph representation of the representative keywords. The visual-summary generator 150 may select a visual-representation style based on the graph representation of the representative keywords by, for example, comparing the graph representation of the representative keywords structurally to any number of visual-representation styles to determine which visual-representation style has the closest structure to the graph structure. The visual-representation styles may include, for example, linear styles in which visual elements are arranged in a line that flows in one direction, for example, top-to-bottom or left-to-right, and non-linear styles, in which visual elements are arranged in any number of different patterns, such as in spirals or parallel lines connected with hairpin turns. The visual-representation styles may also have different levels of connectivity between visual elements, with visual elements being joint or disjoint in any suitable manner.

The visual-summary generator 150 may arrange the images associated with the representative keywords according to the selected visual-representation style and the graph representation of the representative keywords, generating the visual summary of the input text. The visual-summary generator 150 may arrange the images for the representative keywords generated by the image generator 140 as the visual elements of the visual-representation style while preserving the structure of the graph representation of the representative keywords. The visual-summary generator 150 may also add visual elements to the visual summary based on the visual-representation style, such as, for example, visual elements that may connect the images associated with the representative keywords to represent edges between nodes of the graph representation. The visual-summary generator 150 may also add text to the images for the representative keywords, such as the representative keyword or any other keywords from the group the representative keyword was selected from, added to it. The image for a representative keyword may also be visually modified by the visual-summary generator 150 based on the idea count for the idea the representative keyword represents. For example, if a representative keyword represents and idea with a large idea count, the image for the representative keyword may be made larger in the visual summary, as the large idea count may indicate that the idea is prominent in the input text and should be prominent in the visual summary of the input text.

The storage 170 may be any suitable combination of hardware and software for storing data. The storage 170 may include any suitable combination of volatile and non-volatile storage hardware, and may include components of the computing device 100 and hardware accessible to the computing device 100, for example, through wired and wireless direct or network connections. The storage 170 may store the visual-representation styles 171 and the visual summary 173. The visual-representation styles 171 may include various visual-representation styles that the visual-summary generator 150 may select from when generating the visual summary. The visual-representation styles stored as the visual-representation styles 171 may be, for example, templates, rules, or any other data that may describe visual elements and prescribe an arrangement of the visual elements in a two-dimensional space. The visual summary 172 may be the visual summary of the input text generated by the visual-summary generator 150.

Figure 2:
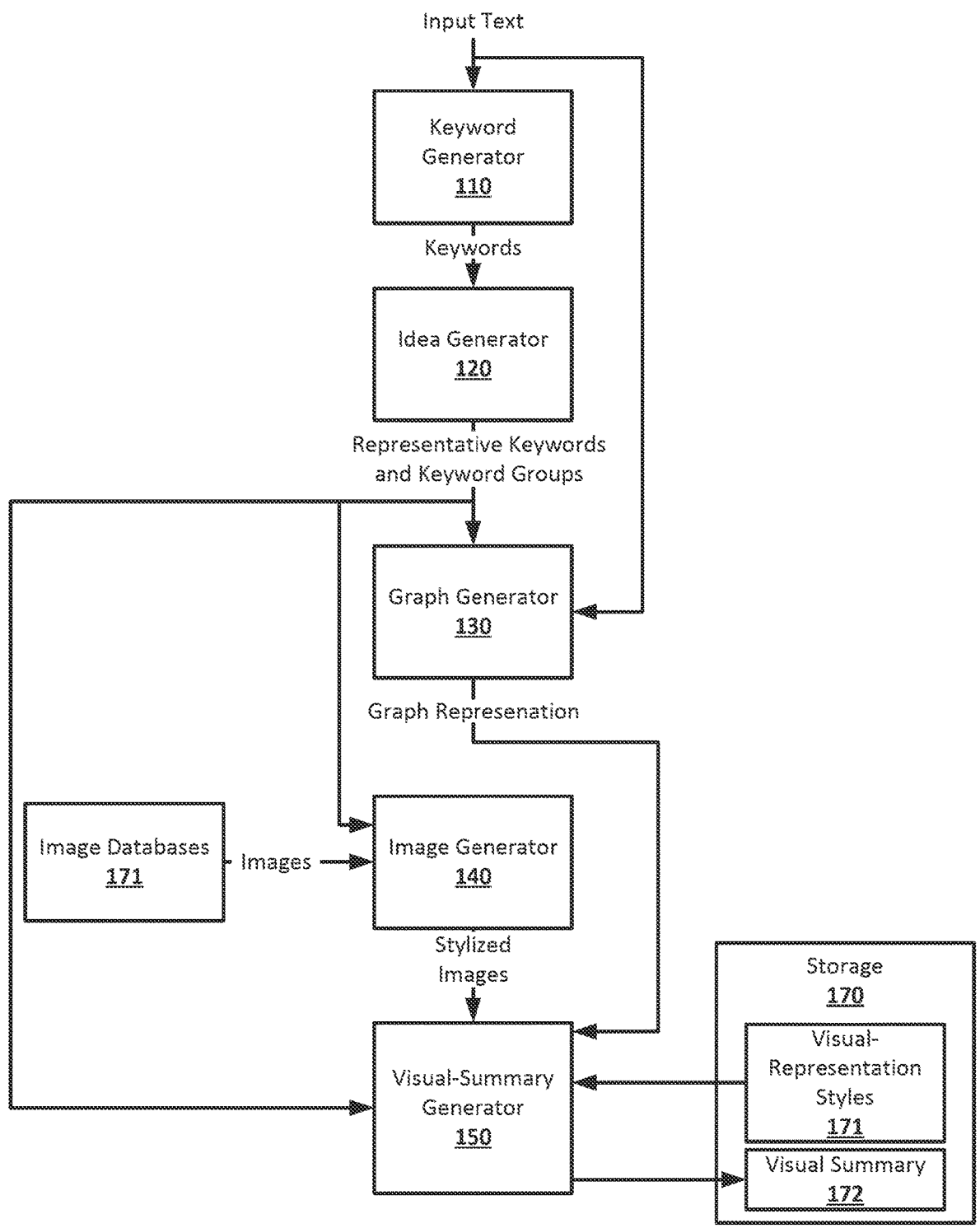
FIG. 2 shows an example arrangement suitable for visual text summary generation according to an implementation of the disclosed subject matter.

FIG. 2 shows an example arrangement suitable for visual text summary generation according to an implementation of the disclosed subject matter. An input text may be received by the keyword generator 110 of the computing device 100. The input text may be in any suitable format, and may be any suitable text, such as the text of meeting minutes, messages from conversation threads of a communication channel, or a transcription of a speech. The input text may be received from any suitable source, including, for example, the storage 170 of the computing device 100, or another computing device accessible to the computing device 100.

The keyword generator 110 may generate keywords from the input text. The keyword generator 110 may use any suitable form of keyword extraction to extract keywords from the input text to generate keywords. For example, the keyword generator 110 may use term TF-IDF, MAKE, KeyBert, TopicRank, or RAKE, or any other type of keyword extraction, to extract keywords from the input text. The keywords generated by the keyword generator 110 from the input text may be individual words, or may be multiword phrases.

The idea generator 120 may receive the keywords generated by the keyword generator 110 and may generate representative keywords and keyword groups. For example, the idea generator 120 may perform any suitable form of multiword synonym inference on the keywords received from the generator 110 and generate groups of keywords that are synonyms that may represent the same idea. The idea generator 120 may select representative keywords from the groups of keywords. The representative keyword selected from a group of keywords may represent the idea represented by the group of keywords. The idea generator 120 may also generate idea counts, which may be counts of the number of keywords in each group of keywords.

The graph generator 130 may receive the representative keywords and keyword groups generated by the idea generator 120 and the input text and may generate a graph representation of the representative keywords. The graph generator 130 may generate a graph representation by determining the relationships between the keywords within the input text. The relationships may be grammatical relationships or may be relationships based on the relative locations within the input text. The relationships between keywords may be imparted to the representative keywords for the ideas the keywords form groups representing. The graph representation generated by the graph generator 130 may include representative keywords as nodes with any relationship between representative keywords represented as an edge of the graph between the nodes for the representative keywords. The graph representation may in some cases be disjoint.

The image generator 140 may receive representative keywords and keyword groups generated by the idea generator 120, may search for and receive images associated with the representative keywords from image databases 171, and may apply stylization to the received images. The image databases 171 may be any suitable databases that may store images in any suitable styles in a searchable manner. The image databases 171 may be any number of databases stored in any storage of any computing devices accessible to the computing device 100, including the storage 170. The image generator 140 may search the image databases 171 using the representative keywords and may receive images that may be associated with the representative keywords in the image databases 171. The image generator 140 may search different databases of the image databases 171 for keywords of different types. For example, the image generator 140 may search for and receive images for representative keywords that are nouns or proper nouns from a database of clipart-style images and images for representative keywords that are verbs from a general online image database that may include images in any style. The image generator 140 may also search the image databases 171 using other keywords from the group that the representative keyword was selected from, for example, to narrow down search results or to ensure that the image received for a representative keyword better represents the idea whose group of the keywords the representative keyword was selected from. The image generator 140 may receive images for all of the representative keywords for an input text. The input generator 140 may apply a style to the received images to generate stylized images. For example, the image generator 140 may include a GAN that may be able to apply to an input image a selected style, rendering the image in that style. The received images may be used as input to the GAN of the image generator 140. Styles applied to the image may include, for example, clipart-styles to non-clipart images, photo styles, any suitable sketching style, styles that mimic artistic styles such as impressionism and cubism, or any other suitable style. All images may have the same style applied to them using the GAN.

The visual-summary generator 150 may receive the stylized images generated by the image generator 140, the representative keywords and keyword groups generated by the idea generator 120, and the graph representation generated by the graph generator 130, and may generate a visual summary of the input text. The visual-summary generator 150 may select a visual-representation style from among the visual-representation styles 171 based on the graph representation of the representative keywords by, for example, comparing the graph representation of the representative keywords structurally to any number of the visual-representation styles 171 to determine which of the visual-representation styles 171 has the closest structure to the graph structure. The visual-summary generator 150 may arrange the images for the representative keywords generated by the image generator 140 as the visual elements of the visual-representation style while preserving the structure of the graph representation of the representative keywords. The visual-summary generator 150 may also add visual elements to the visual summary based on the visual-representation style, such as, for example, visual elements that may connect the images associated with the representative keywords to represent edges between nodes of the graph representation. The visual-summary generator 150 may also add text to the images for the representative keywords, such as the representative keyword or any other keywords from the group the representative keyword was selected from, added to it. The image for a representative keyword may also be visually modified by the visual-summary generator 150 based on the idea count for the idea the representative keyword represents. For example, if a representative keyword represents and idea with a large idea count, the image for the representative keyword may be made larger in the visual summary, as the large idea count may indicate that the idea is prominent in the input text and should be prominent in the visual summary of the input text. The visual summary for the input text may be stored, for example, as the visual summary 172.

Figure 3A:
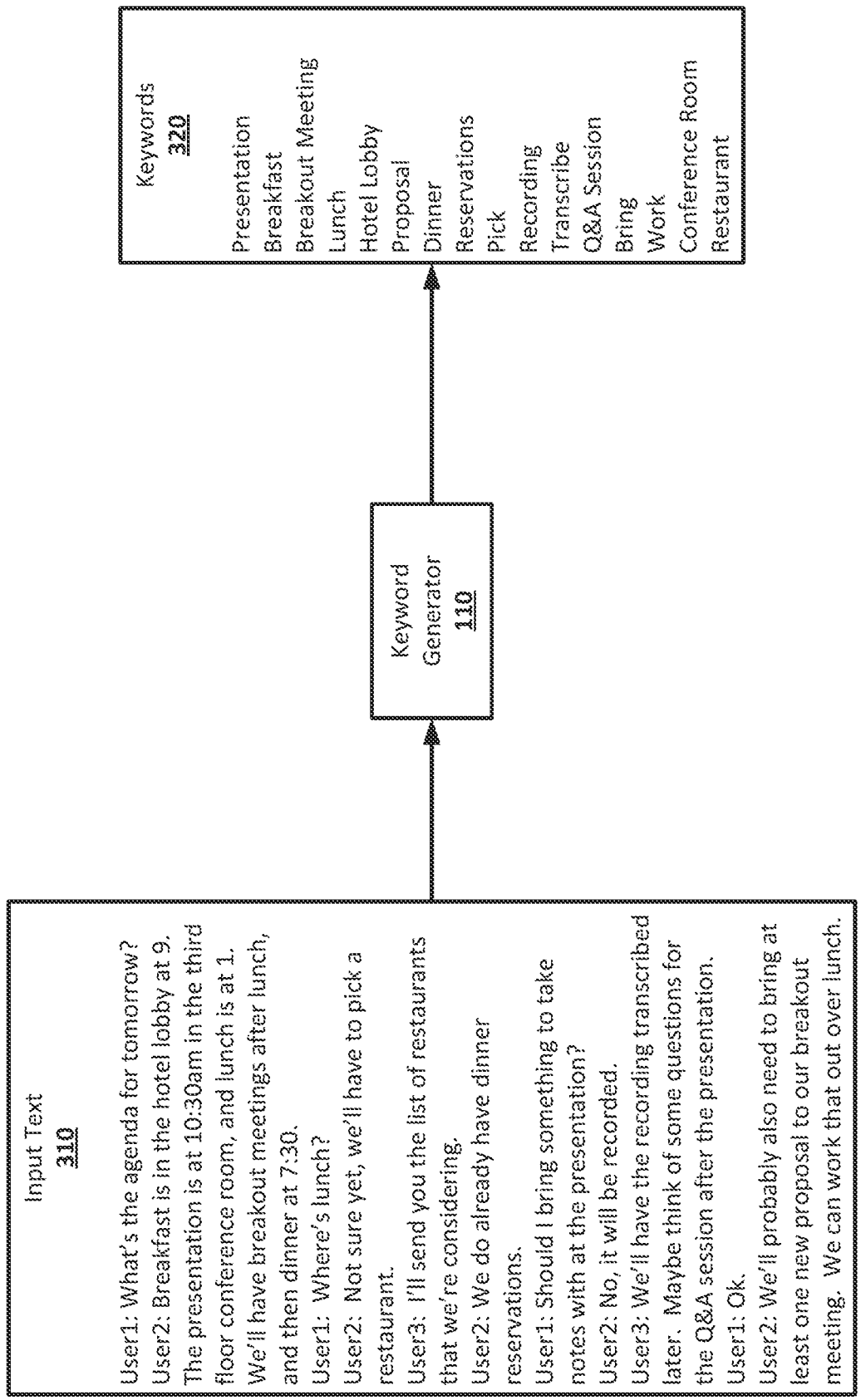
FIG. 3A shows an example arrangement suitable for visual text summary generation according to an implementation of the disclosed subject matter.

FIG. 3A shows an example arrangement suitable for visual text summary generation according to an implementation of the disclosed subject matter. The keyword generator 110 may receive an input text 310. The input text 310 may be, for example, the text of messages from a conversation thread of a communication channel. The keyword generator 110 may generate keywords 320 from the input text 110. The keywords 320 may be generated by, for example, the application of TF-IDF or RAKE to the input text 310. The input text 310 may, for example, include text of messages discussing a daily agenda, and the keywords 310 may include words and phrases from the messages that may indicate the topics of the discussion.

Figure 3B:
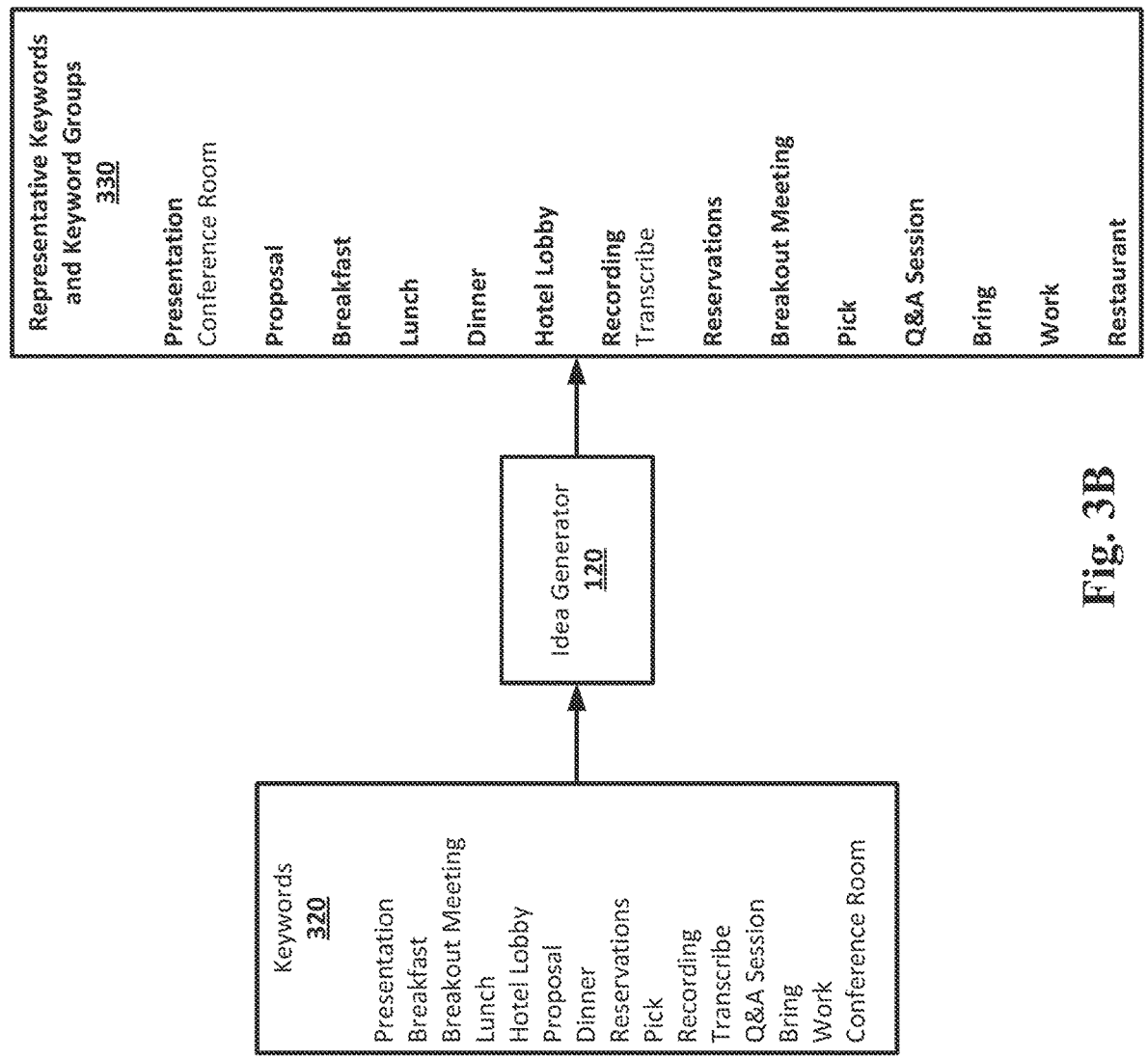
FIG. 3B shows an example arrangement suitable for visual text summary generation according to an implementation of the disclosed subject matter.

FIG. 3B shows an example arrangement suitable for visual text summary generation according to an implementation of the disclosed subject matter. The idea generator 120 may receive the keywords 320 generated from the input text 310 by the keyword generator 320 and may generate representative keywords and keyword groups 330. The idea generator 120 may perform any suitable form of multiword synonym inference on the keywords 320 to generate the representative keywords and keyword groups 330. For example, the keywords "recording" and "transcribe" may be considered to be for the same idea and may form a keyword group, and the keyword "recording" may be selected as the representative keyword for the keyword group.

Figure 3C:
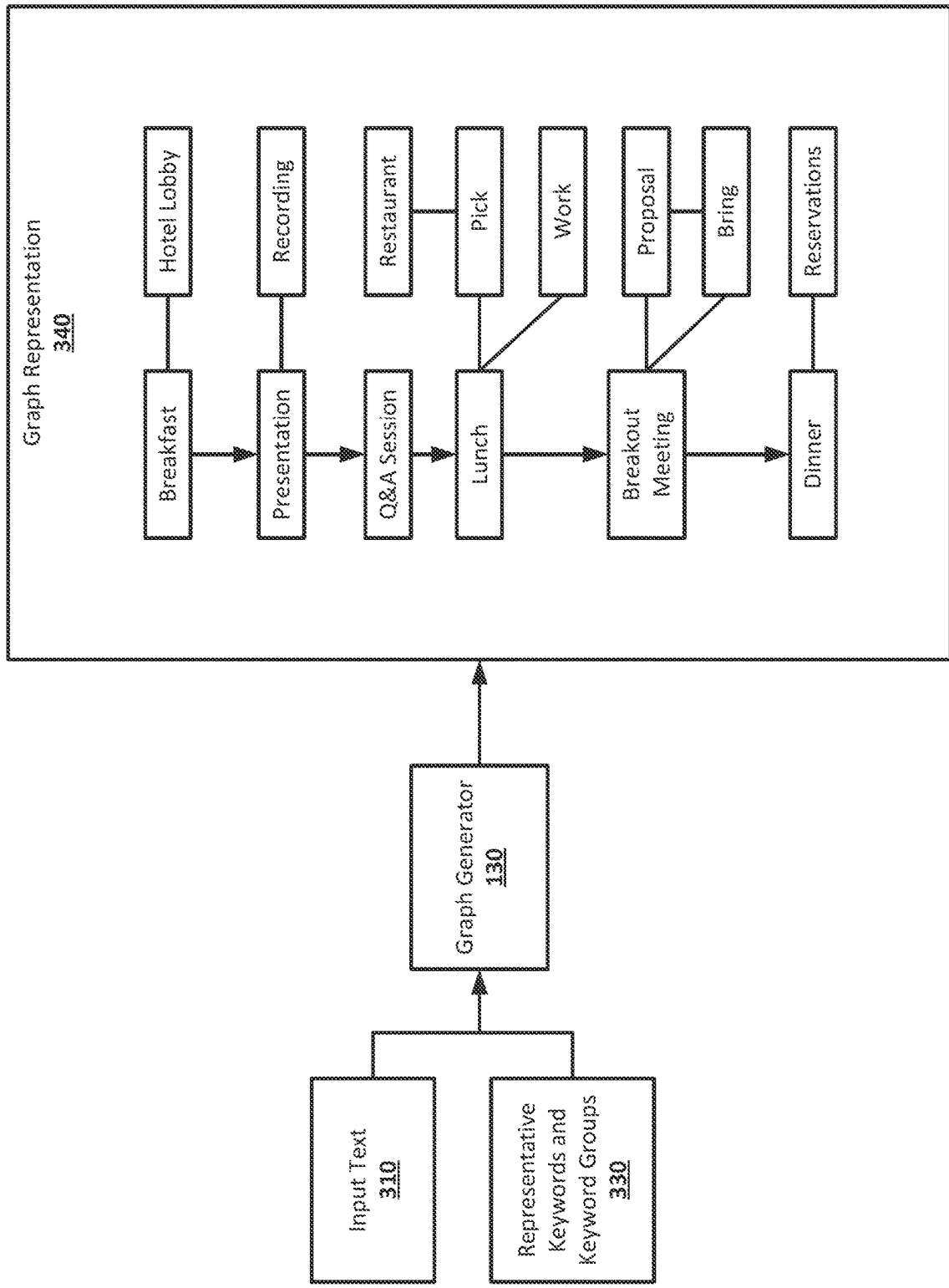
FIG. 3C shows an example arrangement suitable for visual text summary generation according to an implementation of the disclosed subject matter.

FIG. 3C shows an example arrangement suitable for visual text summary generation according to an implementation of the disclosed subject matter. The graph generator 130 may receive the input text 310 and the representative keywords and keyword groups 330 and may generate graph representation 340. The graph representation 340 may use representative keywords as nodes connected with edges that may indicate relationships between the representative keywords in the input text 310. The edges may be directed or non-directed. For example, "breakfast", "presentation", "Q&A session", "lunch", "breakout meeting" and "dinner" may be representative keywords that may be linked in a linear fashion based on their relationships to each other in the input text 310. The representative keywords "proposal" and "bring" may be cyclically connected to the representative keyword "breakout meeting."

Figure 3D:
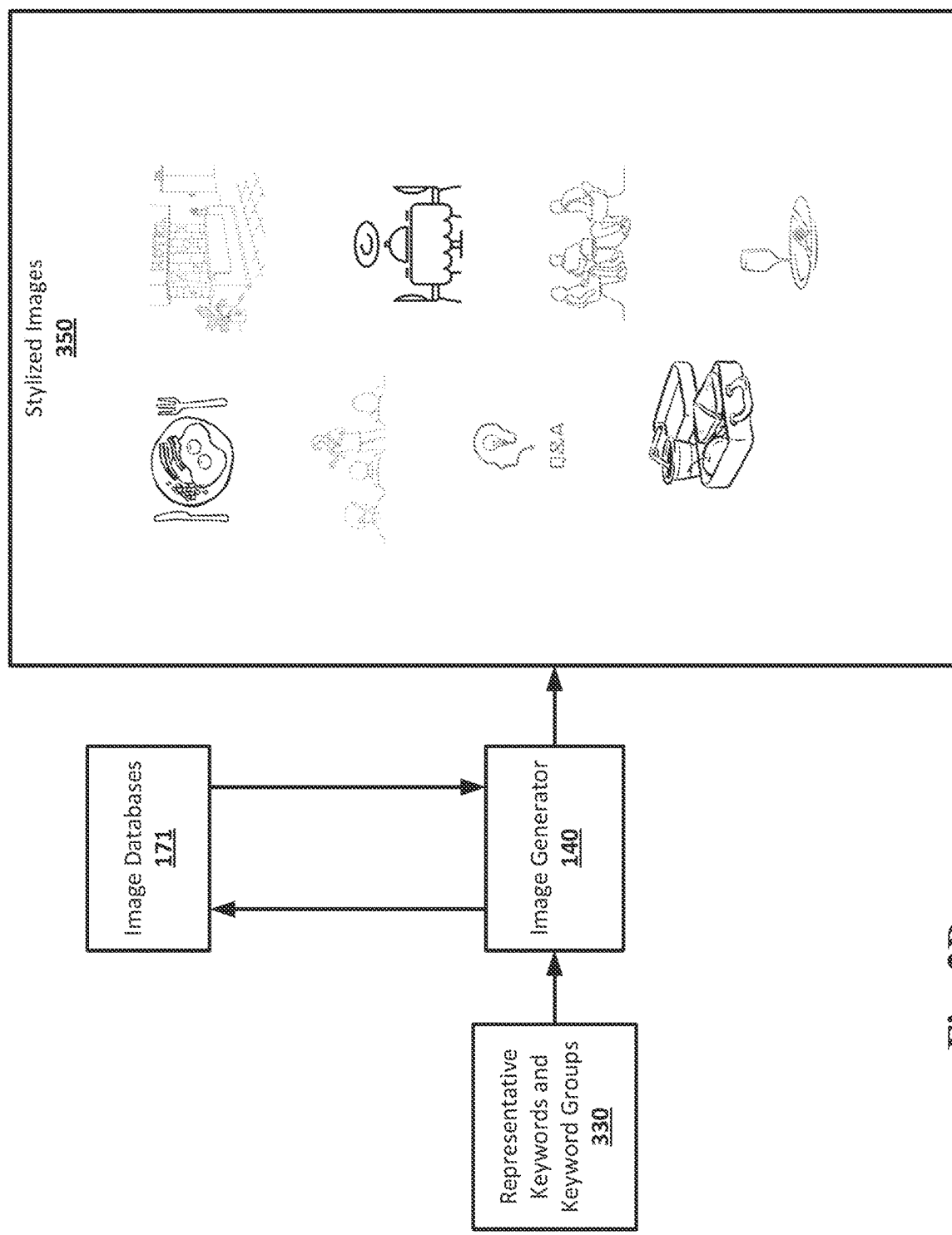
FIG. 3D shows an example arrangement suitable for visual text summary generation according to an implementation of the disclosed subject matter.

FIG. 3D shows an example arrangement suitable for visual text summary generation according to an implementation of the disclosed subject matter. The image generator 140 may receive the representative keywords 330 and may generate the stylized images 350. The image generator 140 may search the image databases 171 using the representative keywords 330 and may receive images that are associated with the representative keywords 330. The images may include visual depictions that are, or are related to, the representative keywords 330. The image generator 140 may apply a style to the images received from the image databases 171 to generate the stylized images 350.

Figure 3E:
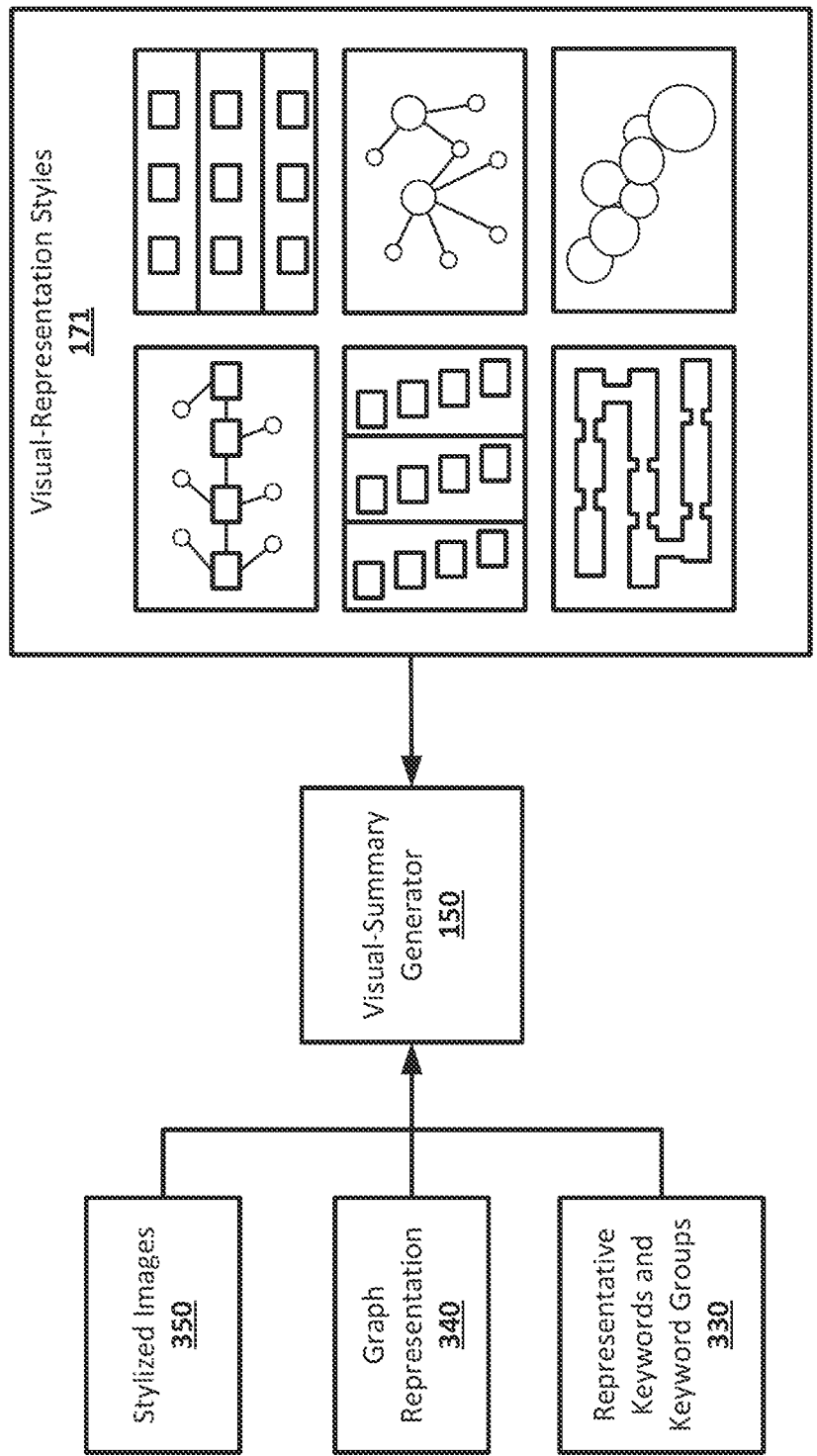
FIG. 3E shows an example arrangement suitable for visual text summary generation according to an implementation of the disclosed subject matter.

FIG. 3E shows an example arrangement suitable for visual text summary generation according to an implementation of the disclosed subject matter. The visual-summary generator 150 may receive the representative keywords and keyword groups 330, graph representation 340, and stylized images 350 and may select one of the visual-representation styles 171, and may generate a visual summary 360. The visual-summary generator 150 may select one of the visual-representation styles 171 based on structural similarities with the graph representation 150. The graph representation 340 may have a primarily linear structure, which may result in the visual-summary generator 150 selecting a visual-representation style that is also primarily linear. The visual-representation styles may indicate how visual elements should be placed along with a general organizational structure for the visual elements. For example, one visual-representation style may include columns of cascading visual elements, another may include visual elements arranged in rows, another may include visual elements arranged generally on top of each other in a diagonal pattern, another may include connected visual elements that flow left to right, down, right to left, down, and right to left, and another may include visual elements arranged primarily linearly with orbiting visual elements.

Figure 3F:
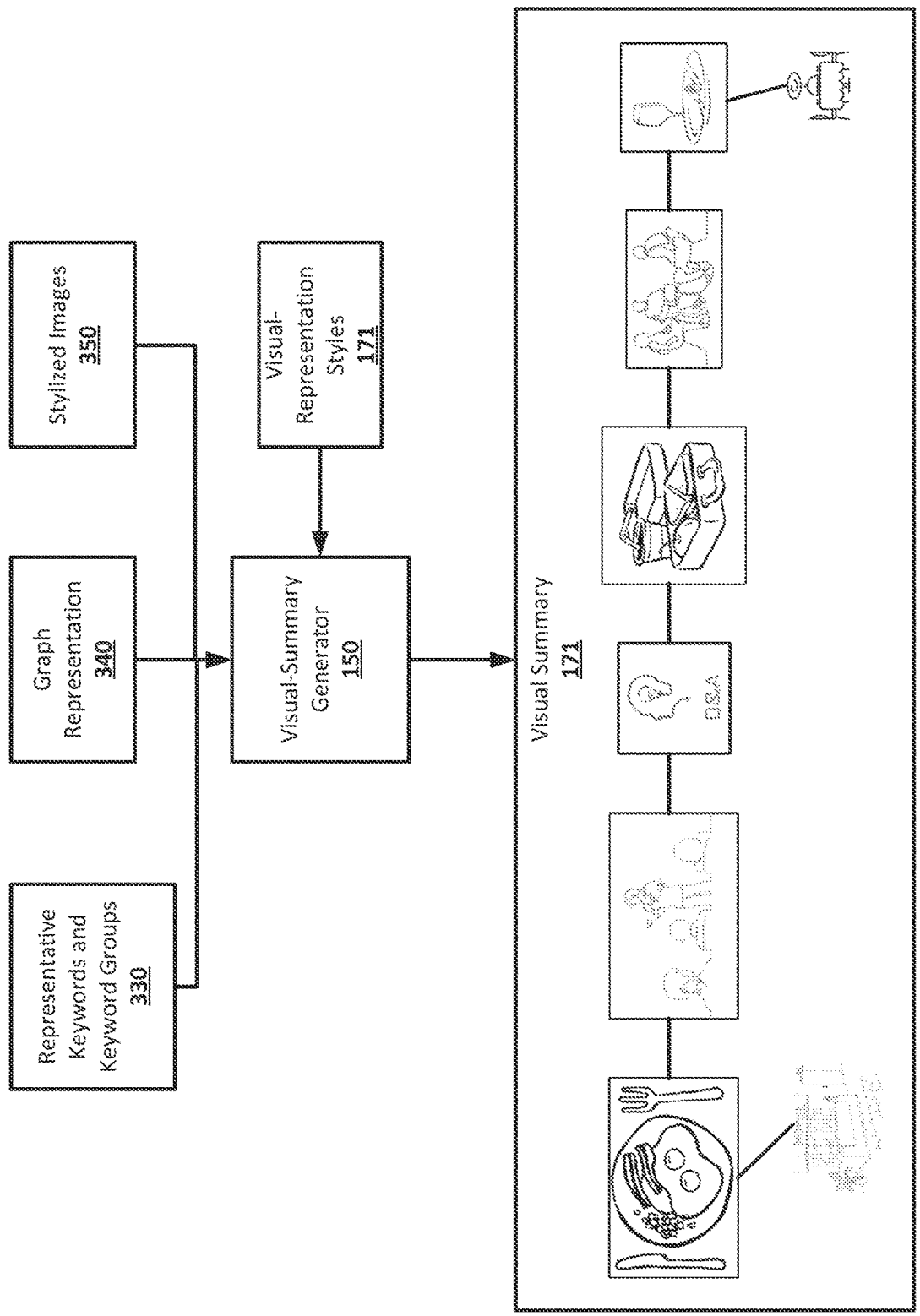
FIG. 3F shows an example arrangement suitable for visual text summary generation according to an implementation of the disclosed subject matter.

FIG. 3F shows an example arrangement suitable for visual text summary generation according to an implementation of the disclosed subject matter. The visual-summary generator 150 may, after selecting a visual-representation style, arrange the stylized images 350 in accordance with the selected visual-representation style and the graph representation 340. The arrangement may maintain the relationships between the representative keywords represented by the stylized images 350 as shown by the nodes and edges of the graph representation 340, while placing the stylized images 350 into the structure of the selected visual-representation style. The stylized images 350 may be used as visual elements of the visual-representation styles in the visual summary 360. The visual summary 360 may also include visual elements that may represent the edges of the graph representation 340, along with other visual elements that may be part of the visual-representation style itself.

Figure 4:
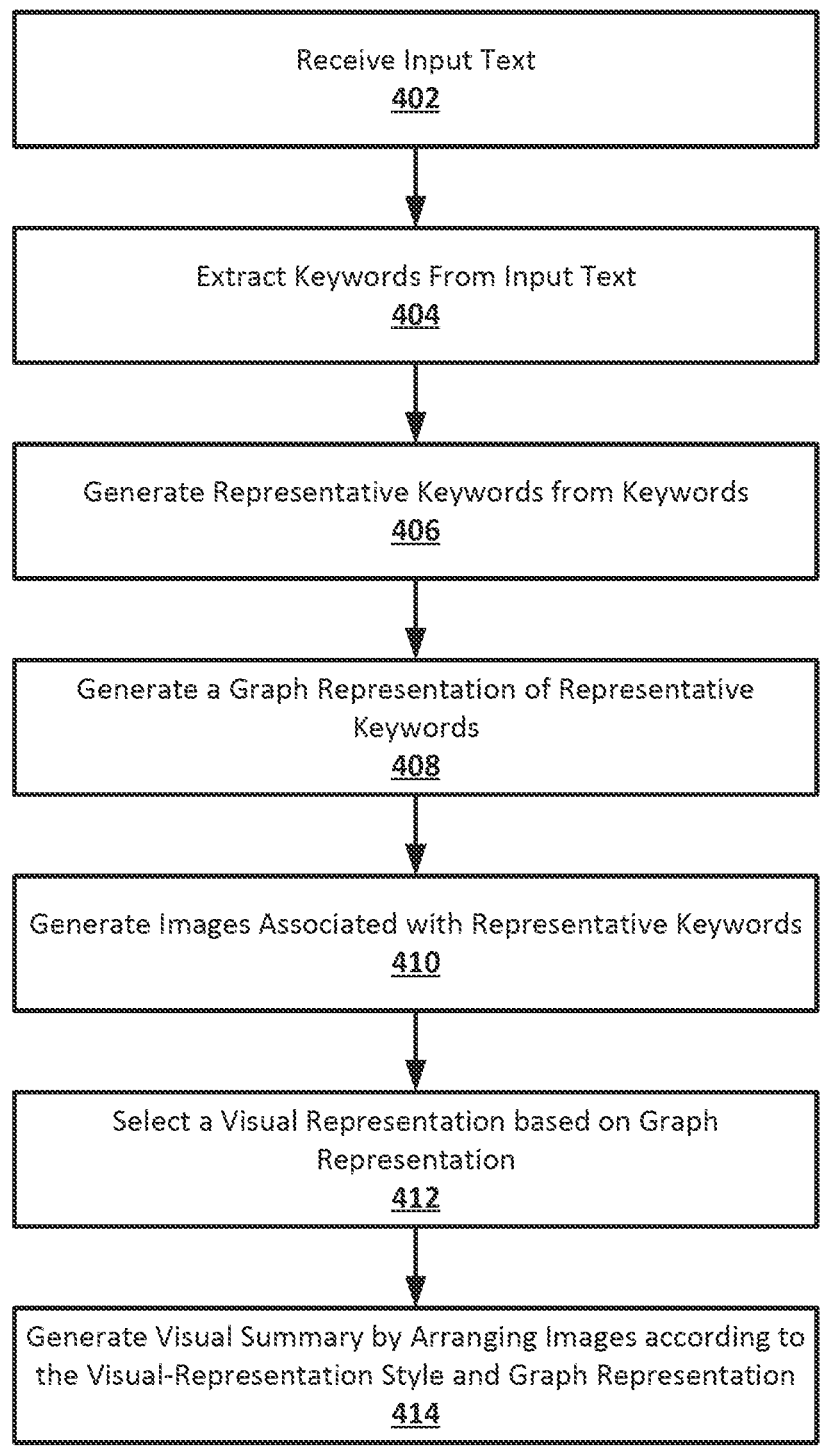
FIG. 4 shows an example procedure suitable for visual text summary generation according to an implementation of the disclosed subject matter.

FIG. 4 shows an example procedure suitable for visual text summary generation according to an implementation of the disclosed subject matter. At 402, an input text may be received. For example, the input text 310 may be received by the keyword generator 110 of the computing device 100. The input text 310 may be received in any suitable format and may be received from any suitable source. The input text 310 may include text from, for example, a conversation thread of a communication channel, minutes of a meeting, a transcription of a speech, or any other conversational or non-conversational source of text.

At 404, keywords may be extracted from the input text. For example, the keyword generator 110 may generate keywords 320 for the input text 310 by extracting keywords from the input text 310 using any suitable form of keyword extraction, such as TF-IDF or RAKE. The keywords 320 may be individual words or may be multi-word phrases. The keyword generator 110 may extract keywords at any level of granularity of the input text 310, including, for example, at the page, paragraph, or document level.

At 406, representative keywords may be generated from the keywords. For example, the idea generator 120 may receive the keywords generated by the keyword generator 110 and perform any suitable form of multiword synonym inference to generate groups of keywords from keywords that are synonyms or otherwise related to the same idea. The idea generator 120 may then select representative keywords from the groups of keywords, generating the representative keywords and keyword groups 330.

At 408, a graph representation of the representative keywords may be generated. For example, the graph generator 130 may receive the representative keywords and keyword groups 330 and the input text 310 and may determine relationships between the representative keywords within the context of the input text 310. The relationships between the representative keywords may be used by the graph generator 130 to generate the graph representation 340. The graph representation 340 may include representative keywords as nodes, and the relationships between the representative keywords in the context of the input text 310 may be represented by edges between the nodes of the graph representation 340.

At 410, images associated with representative keywords may be generated. For example, the image generator 140 may receive the representative keywords and keyword groups 330 and may search the image databases 171 for images using the representative keywords. The image generator 140 may receive the images found in the image databases 171 by searching for the representative keywords and may apply any suitable style to the received images to generate the stylized images 350. For example, the image generator 140 may use a GAN that may modify input images by applying a particular style, for example, sketching style such as clip art or line art, to the images. The stylized images 350 may be images that are associated with the representative keywords and that have a consistent image style among them.

At 412, a visual representation may be selected based on the graph representation. For example, the visual-summary generator 150 may receive the graph representation 340 and may compare the structure of the graph representation 340 to the structures of the visual-representation styles 171. The visual-summary generator 150 may select a visual-representation style that is the closest in structure to the graph representation 340 from among the visual-representation styles 171. The selection may be made in any suitable manner. For example, the visual-representation styles 171 may have graph data that comparable to the graph representation 340, or any suitable machine learning model may be used to make the selection.

At 414, a visual summary may be generated by arranging the images according to the visual-representation style and the graph representation. For example, the visual-summary generator 150 may receive the graph representation 340, the representative keywords and keyword groups 330, and the styled images 350, and may generate the visual summary 171 for the input text 310 by arranging the stylized images 350 according to the selected visual-representation style and the graph representation 340. The visual-summary generator 150 may, for example, align nodes of the graph representation 340 with visual elements of the selected visual-representation style, and may place the stylized image associated with the representative keyword of a node at the location of the visual element the node was aligned with. This may result in the visual summary 171 having the appearance of the selected visual-representation style with the stylized images 350 as visual elements arranged in a way that preserves the structure of the graph representation 340. The visual-summary generator 150 may also modify any suitable visual property of the stylized images, for example, based on idea counts for the representative keywords associated with the stylized images. For example, a stylized image that is associated with a representative keyword with a higher idea count may be made larger or more prominent in any suitable manner when compared to stylized images for representative keywords with lower idea counts.

Figure 5:
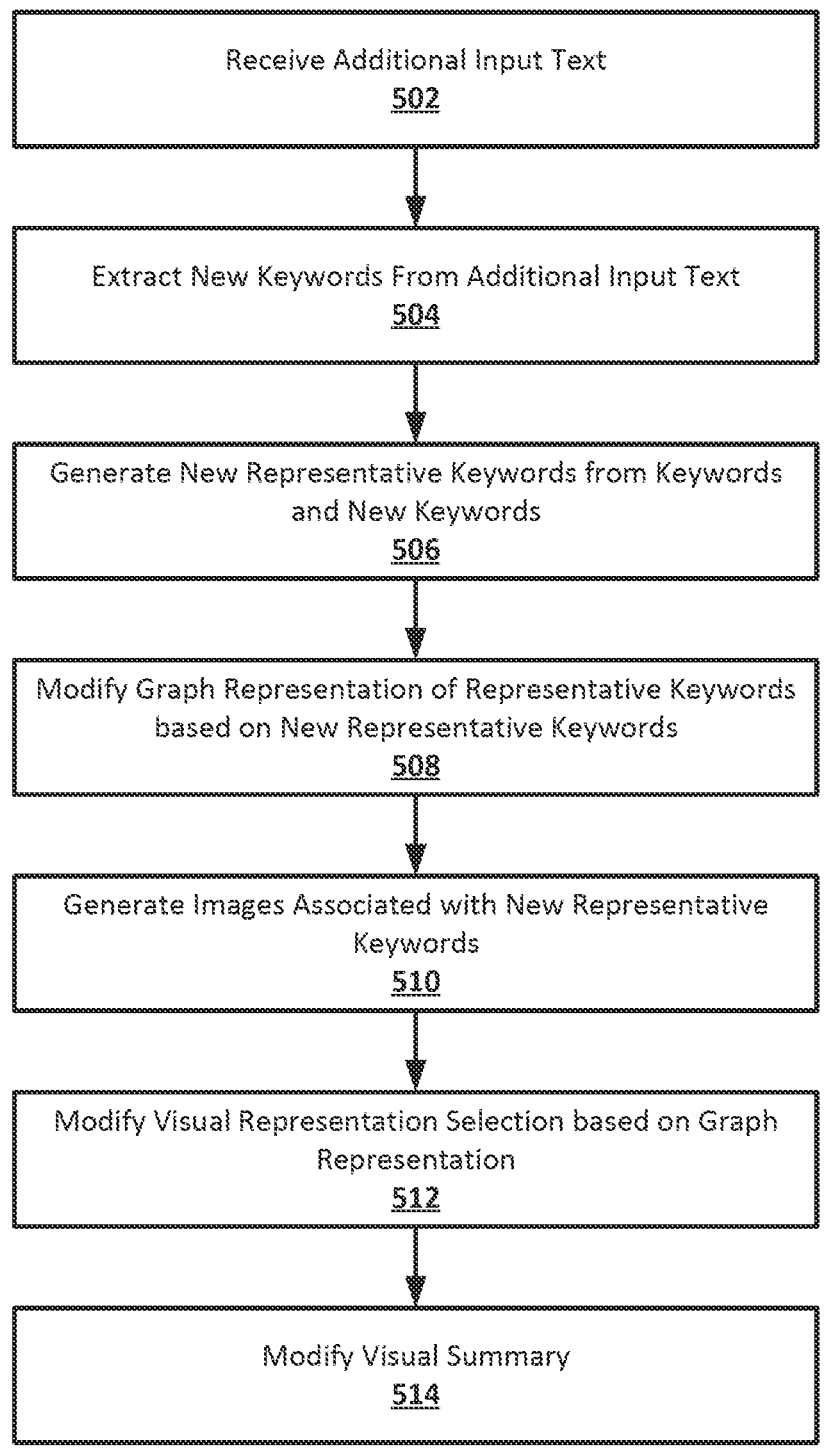
FIG. 5 shows an example procedure suitable for visual text summary generation according to an implementation of the disclosed subject matter.

FIG. 5 shows an example procedure suitable for visual text summary generation according to an implementation of the disclosed subject matter. At 402, additional input text may be received. For example, updated or additions to the input text 310 may be received by the keyword generator 110 of the computing device 100. The input text 310 may be a live document, for example, a conversation thread in which users are still posting messages, resulting in additional text being added to the input text 310 after the visual summary 171 is generated from the input text 310. The updates to the input text 310 may be received in any suitable format and may be received from any suitable source.

At 504, new keywords may be extracted from the input text. For example, the keyword generator 110 may generate new keywords for the input text 310 by extracting keywords from the additional input text using any suitable form of keyword extraction, such as TF-IDF or RAKE. The new keywords may be individual words or may be multi-word phrases. The keyword generator 110 may generate the new keywords using only the additional input text or using the input text 310 with the additional input text added to it. The new keywords may be generated in addition to the already generated keywords or may replace the already generated keywords for the input text 310.

At 506, new representative keywords may be generated from the new keywords and the keywords. For example, the idea generator 120 may receive the new keywords generated by the keyword generator 110 and perform any suitable form of multiword synonym inference on the new keywords and previously generated keywords, if they were not replaced by the new keywords, to generate groups of keywords from keywords that are synonyms or otherwise related to the same idea. The idea generator 120 may then select new representative keywords from the groups of keywords. The new representative keywords may be in addition to, or may replace, the previously generated representative keywords.

At 508, a graph representation of the representative keywords may be modified based on the new representative keywords. For example, the graph generator 130 may receive the new representative keywords and keyword groups and the input text 310 and additional input text and may determine relationships between the representative keywords within the context of the input text 310 and additional input text. The relationships between the representative keywords may be used by the graph generator 130 to modify the graph representation 340 to generate a new graph representation. For example, the graph generator 130 may add nodes for new representative keywords to the graph representation 340. If the new representative keywords were generated from new keywords that replaced the previously generated keywords, the new graph representation may be generated anew by the graph generator 130, discarding the graph representation 340, or the graph representation 340 may be modified, having nodes added and removed, for example, to reflect differences between the new representative keywords and the previously generated representative keywords. For example, if the new representative keywords replaced the previously generated representative keywords and one of the previously generated representative keywords is not one of the new representative keywords, that node for the previously generated representative keyword may be removed from the graph representation 340 when generating the new graph representation.

At 510, images associated with new representative keywords may be generated. For example, the image generator 140 may receive the new representative keywords and keyword groups and may search the image databases 171 for images using the new representative keywords. The image generator 140 may receive the images found in the image databases 171 by searching for the new representative keywords and may apply any suitable style to the received images to generate additional stylized images. For example, the image generator 140 may use a GAN that may modify input images by applying a particular style, for example, sketching style such as clip art or line art, to the images. The additional stylized images may be images that are associated with the new representative keywords and that have a consistent image style among them and with the previously generated stylized images 350.

At 512, a visual representation selection may be modified based on the graph representation. For example, the visual-summary generator 150 may receive the new graph representation and may compare the structure of the graph representation 340 to the structures of the visual-representation styles 171. The visual-summary generator 150 may modify the previously made selection of a visual-representation style, for example, selecting a new visual-representation style the visual-representation style closest in structure to the new graph representation is different from the visual-representation style that was selected for the graph representation 340. This may occur, for example, if the new graph representation was generated anew based on the new representative keywords or was generated by heavily modifying the graph representation 340 through additional and removal of nodes and edges due to new representative keywords being generated based on the additional input text and previously generated representative keywords being removed. The visual-summary generator 150 may also not select a new visual-representation style if the previously selected visual-representation style is still the closest in structure to the new graph representation.

At 514, a visual summary may be modified. For example, the visual-summary generator 150 may receive the new graph representation, new representative keywords and keyword groups, and the styled images 350 and additional stylized images, and may modify the visual summary 171 for the input text 310 and additional input text, generating a new visual summary. For example, if the new graph representation only has new nodes added to the graph representation 340 and the selection of the visual-representation style has not changed, the visual-summary generator 150 may add stylized images associated with the representative keywords for the new nodes to the visual summary 171 at locations indicated by the selected visual-representation style. The new visual summary may in this case be the visual summary 171 with added stylized images. If the new graph representation has both added and removed nodes when compared with the graph representation 340, the visual summary 171 may be modified to remove stylized images associated with the representative keywords for the removed nodes in addition to added stylized images for the new nodes to generate the new visual summary. Stylized images and other visual elements of the visual summary 171 may also be modified to reflect other differences between the new graph representation and the graph representation 340, such as changes in the edges that connect nodes. If a new visual-representation style has been selected, the new visual summary may be generated anew from the new graph representation, stylized images 350 and additional stylized images in order to reflect the newly selected visual-representation style.

The visual summary for an input text may be modified, or newly generated, continuously as there are subsequent updates to the input text 310. This may allow the visual summary to reflect a live conversation as the conversation continues.

Figure 6:
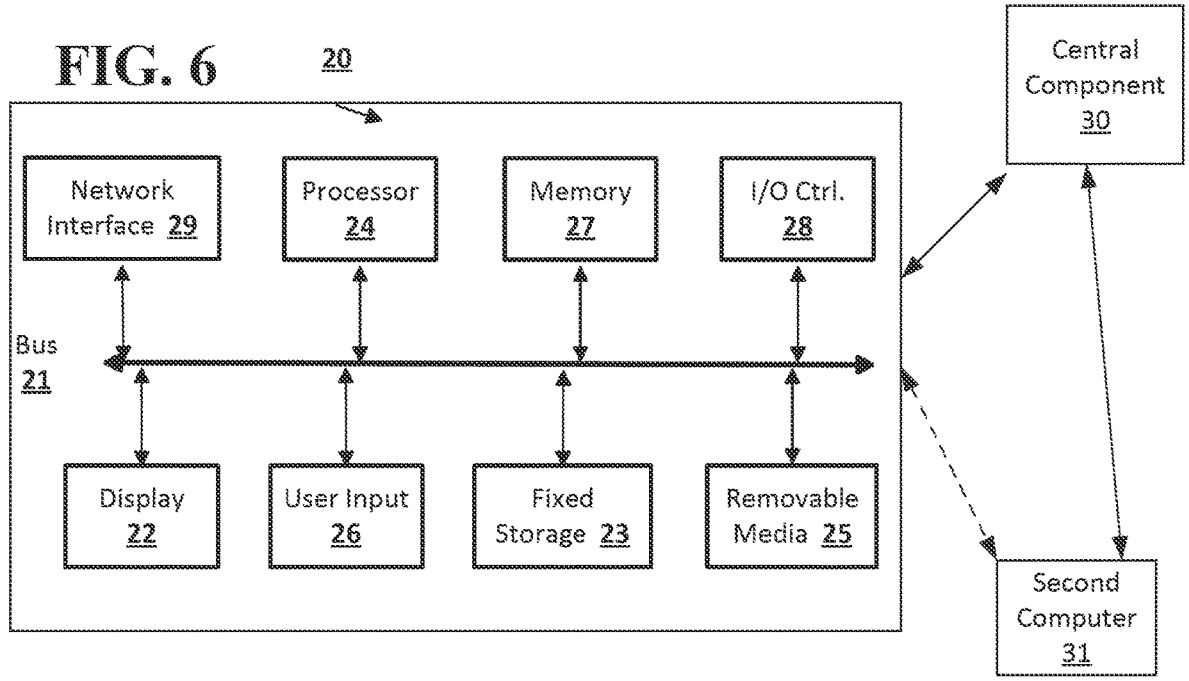
FIG. 6 shows a computer according to an implementation of the disclosed subject matter.

Implementations of the presently disclosed subject matter may be implemented in and used with a variety of component and network architectures. FIG. 6 is an example computer 20 suitable for implementing implementations of the presently disclosed subject matter. As discussed in further detail herein, the computer 20 may be a single computer in a network of multiple computers. As shown in FIG. 6, computer may communicate a central component 30 (e.g., server, cloud server, database, etc.). The central component 30 may communicate with one or more other computers such as the second computer 31. According to this implementation, the information obtained to and/or from a central component 30 may be isolated for each computer such that computer 20 may not share information with computer 31. Alternatively or in addition, computer 20 may communicate directly with the second computer 31.

The computer (e.g., user computer, enterprise computer, etc.) 20 includes a bus 21 which interconnects major components of the computer 20, such as a central processor 24, a memory 27 (typically RAM, but which may also include ROM, flash RAM, or the like), an input/output controller 28, a user display 22, such as a display or touch screen via a display adapter, a user input interface 26, which may include one or more controllers and associated user input or devices such as a keyboard, mouse, WiFi/cellular radios, touchscreen, microphone/speakers and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 enable data communication between the central processor 24 and the memory 27, which may include read-only memory (ROM) or flash memory (neither shown), and random access memory (RAM) (not shown), as previously noted. The RAM can include the main memory into which the operating system and application programs are loaded. The ROM or flash memory can contain, among other code, the Basic Input-Output system (BIOS) which controls basic hardware operation such as the interaction with peripheral components. Applications resident with the computer 20 can be stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may enable the computer to communicate with other computers via one or more local, wide-area, or other networks, as shown in FIG. 7.

Many other devices or components (not shown) may be connected in a similar manner (e.g., document scanners, digital cameras and so on). Conversely, all of the components shown in FIG. 6 need not be present to practice the present disclosure. The components can be interconnected in different ways from that shown. The operation of a computer such as that shown in FIG. 6 is readily known in the art and is not discussed in detail in this application. Code to implement the present disclosure can be stored in computer-readable storage media such as one or more of the memory 27, fixed storage 23, removable media 25, or on a remote storage location.

Figure 7:
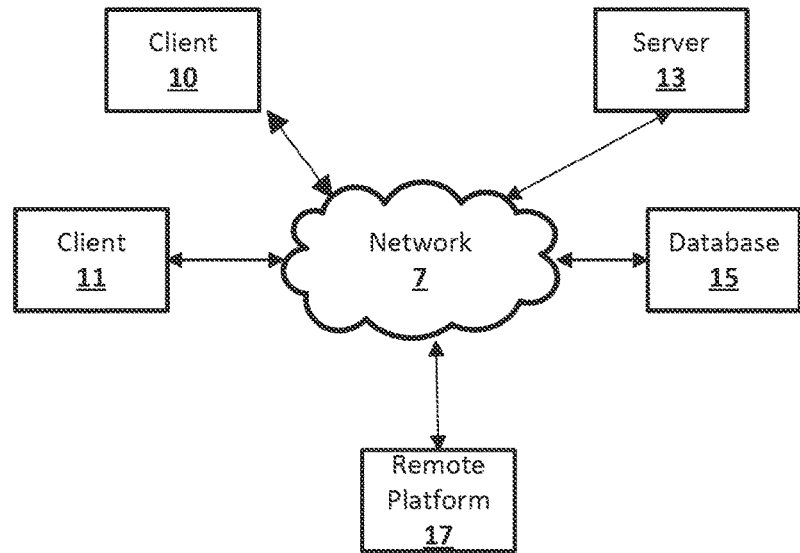
FIG. 7 shows a network configuration according to an implementation of the disclosed subject matter.

FIG. 7 shows an example network arrangement according to an implementation of the disclosed subject matter. One or more clients 10, 11, such as computers, microcomputers, local computers, smart phones, tablet computing devices, enterprise devices, and the like may connect to other devices via one or more networks 7 (e.g., a power distribution network). The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15. Information from or about a first client may be isolated to that client such that, for example, information about client 10 may not be shared with client 11. Alternatively, information from or about a first client may be anonymized prior to being shared with another client. For example, any client identification information about client 10 may be removed from information provided to client 11 that pertains to client 10.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

The foregoing description, for purpose of explanation, has been described with reference to specific implementations.

However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A computer-implemented method comprising:
   receiving an input text;
   extracting keywords from the input text;
   generating representative keywords from the keywords;
   generating a graph representation of the representative keywords, wherein the graph representation comprises nodes representing the keywords and edges connecting the nodes and wherein at least three of the nodes are connected cyclically;
   receiving images associated with the representative keywords;
   selecting a visual-representation style based on the graph representation of the representative keywords, wherein the selected visual-representation style comprises at least two disjoint visual elements; and
   arranging the images associated with the representative keywords according to the selected visual-representation style and the graph representation of the representative keywords.

2. The computer-implemented method of claim 1, wherein the input text comprises text of a communications channel, text of a speech, or meeting minutes.

3. The computer-implemented method of claim 1, wherein extracting keywords from the input text comprises using term frequency-inverse document frequency (TF-IDF), TopicRank, Yet Another Keyword Extractor (YAKE), KeyBert, or Rapid Automated Keyword Extraction (RAKE).

4. The computer-implemented method of claim 1, wherein generating representative keywords from the keywords further comprises grouping keywords into keyword groups using multi-word synonym inference and selecting the representative keywords from the keyword groups.

5. The computer-implemented method of claim 4, wherein the representative keywords represent ideas, and further comprising:
   generating idea counts for the ideas using the multi-word synonym inference; and
   adjusting a visual property of the images associated with the representative keywords based on the idea counts for the ideas represented by the representative keywords.

6. The computer-implemented method of claim 1, wherein receiving images associated with the representative keywords further comprises applying a selected style to the images using a generative adversarial network.

7. The computer-implemented method of claim 1, further comprising receiving additional input text;
   extracting new keywords from the additional input text;
   generating new representative keywords from the new keywords and the keywords;
   modifying the graph representation of the representative keywords based on the new representative keywords;
   receiving images associated with the new representative keywords;
   modifying the selection of the visual-representation style based on the modifying of the graph representation of the keywords; and
   modifying the arrangement of the images associated with the representative keywords according to the selected visual-representation style and the graph representation of the representative keywords based on the modifying of the visual-representation style and the modifying of the graph representation of the keywords, comprising at least one of adding an image representing a new representative keyword to the arrangement of images and removing an image representing a representative keyword from the arrangement of images.

8. The computer-implemented method of claim 1, wherein the graph representation comprises nodes associated with the representative keywords and edges based on the relationships between the representative keywords in the input text.

9. A computer-implemented system comprising:
   a processor that receives an input text,
      extracts keywords from the input text,
      generates representative keywords from the keywords,
      generates a graph representation of the representative keywords, wherein the graph representation comprises nodes representing the keywords and edges connecting the nodes and wherein at least three of the nodes are connected cyclically,
      receives images associated with the representative keywords,
      selects a visual-representation style based on the graph representation of the representative keywords, wherein the selected visual-representation style comprises at least two disjoint visual elements, and
      arranges the images associated with the representative keywords according to the selected visual-representation style and the graph representation of the representative keywords.

10. The computer-implemented system of claim 9, wherein the input text comprises text of a communications channel, text of a speech, or meeting minutes.

11. The computer-implemented system of claim 9, wherein the processor extracts keywords from the input text comprises using term frequency-inverse document frequency (TF-IDF), TopicRank, Yet Another Keyword Extractor (YAKE), KeyBert, or Rapid Automated Keyword Extraction (RAKE).

12. The computer-implemented system of claim 9, wherein the processor generates representative keywords from the keywords further by grouping keywords into keyword groups using multi-word synonym inference and selecting the representative keywords from the keyword groups.

13. The computer-implemented system of claim 12, wherein the representative keywords represent ideas, wherein the processor further:
   generates idea counts for the ideas using the multi-word synonym inference, and
   adjusts a visual property of the images associated with the representative keywords based on the idea counts for the ideas represented by the representative keywords.

14. The computer-implemented system of claim 9, wherein the processor receives images associated with the representative keywords by applying a selected style to the images using a generative adversarial network.

15. The computer-implemented system of claim 9, wherein the processor further receives additional input text;
   extracts new keywords from the additional input text, generates new representative keywords from the new keywords and the keywords, modifies the graph representation of the representative keywords based on the new representative keywords, receives images associated with the new representative keywords, modifies the selection of the visual-representation style based on the modifying of the graph representation of the keywords, and modifies the arrangement of the images associated with the representative keywords according to the selected visual-representation style and the graph representation of the representative keywords based on the modifying of the visual-representation style and the modifying of the graph representation of the keywords, comprising at least one of adding an image representing a new representative keyword to the arrangement of images and removing an image representing a representative keyword from the arrangement of images.

16. The computer-implemented system of claim 9, wherein the graph representation comprises nodes associated with the representative keywords and edges based on the relationships between the representative keywords in the input text.

17. A system comprising: one or more computers and one or more non-transitory storage devices storing instructions which are operable, when executed by the one or more computers, to cause the one or more computers to perform operations comprising:

receiving an input text;

extracting keywords from the input text;

generating representative keywords from the keywords;

generating a graph representation of the representative keywords, wherein the graph representation comprises nodes representing the keywords and edges connecting the nodes and wherein at least three of the nodes are connected cyclically;

receiving images associated with the representative keywords;

selecting a visual-representation style based on the graph representation of the representative keywords, wherein the selected visual-representation style comprises at least two disjoint visual elements; and arranging the images associated with the representative keywords according to the selected visual-representation style and the graph representation of the representative keywords.

18. The system of claim 17, the instructions which are operable, when executed by the one or more computers, to cause the one or more computers to perform operations comprising generating representative keywords from the keywords further comprise instructions which are operable, when executed by the one or more computers, to cause the one or more computers to perform operations comprising:

grouping keywords into keyword groups using multi-word synonym inference and selecting the representative keywords from the keyword groups.

19. The system of claim 17, wherein the representative keywords represent ideas, and wherein the one or more computers and one or more non-transitory storage devices further store instructions which are operable, when executed by the one or more computers, to cause the one or more computers to perform the operation comprising:

generating idea counts for the ideas using the multi-word synonym inference; and adjusting a visual property of the images associated with the representative keywords based on the idea counts for the ideas represented by the representative keywords.

20. The system of claim 17, wherein the one or more computers and one or more non-transitory storage devices further store instructions which are operable, when executed by the one or more computers, to cause the one or more computers to further perform operations comprising:

receiving additional input text;

extracting new keywords from the additional input text;

generating new representative keywords from the new keywords and the keywords;

modifying the graph representation of the representative keywords based on the new representative keywords;

receiving images associated with the new representative keywords;

modifying the selection of the visual-representation style based on the modifying of the graph representation of the keywords; and modifying the arrangement of the images associated with the representative keywords according to the selected visual-representation style and the graph representation of the representative keywords based on the modifying of the visual-representation style and the modifying of the graph representation of the keywords, comprising at least one of adding an image representing a new representative keyword to the arrangement of images and removing an image representing a representative keyword from the arrangement of images.

* * * * *